UNITED STATES PATENT OFFICE.

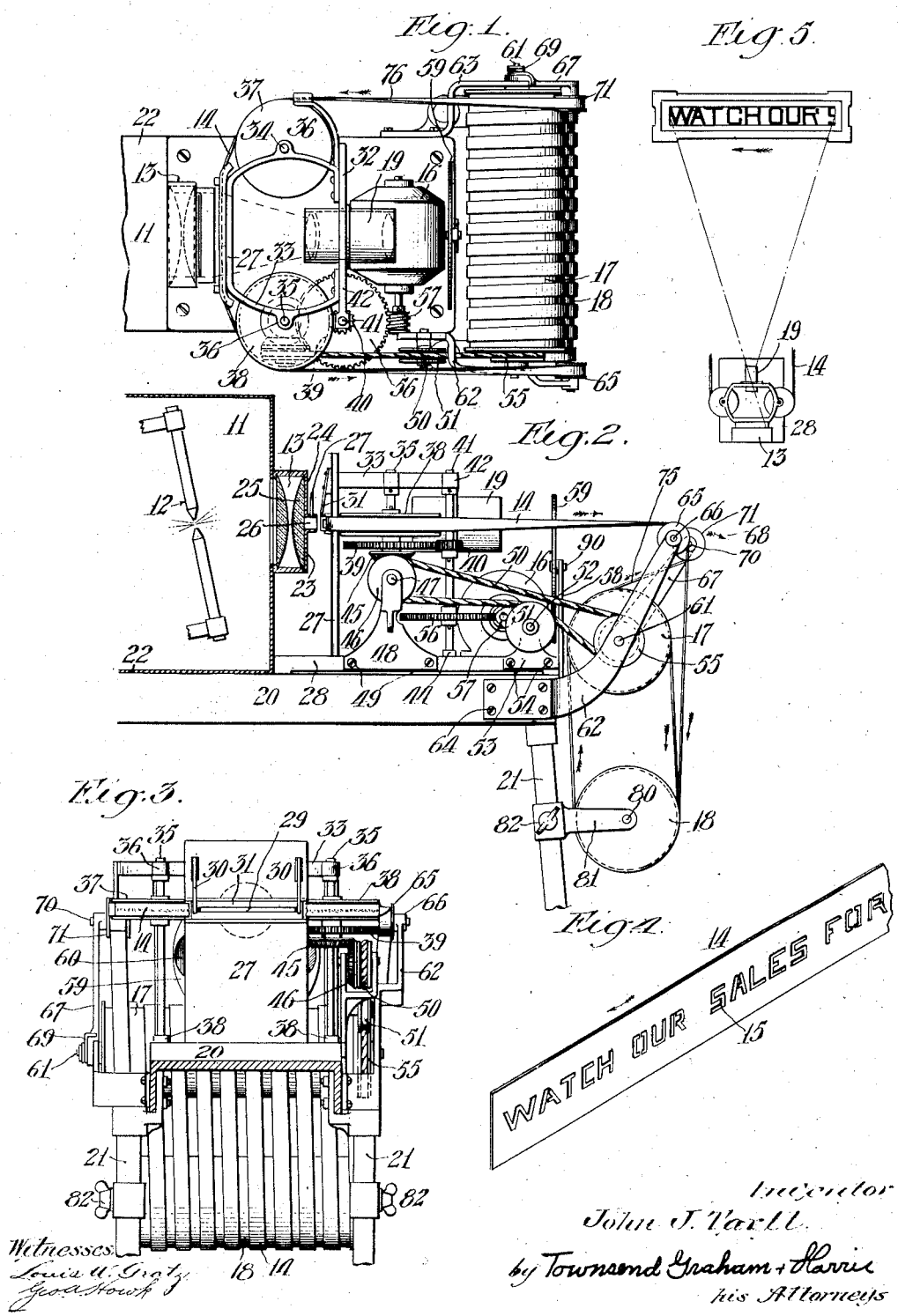

JOHN J. TARTT, OF LOS ANGELES, CALIFORNIA.

PANORAMAGRAPH.

1,282,006.  Specification of Letters Patent.  Patented Oct. 15, 1918.

Application filed August 16, 1915. Serial No. 45,825.

*To all whom it may concern:*

Be it known that I, JOHN J. TARTT, a citizen of the United States, residing at Los Angeles, in the county of Los Angeles and State of California, have invented a new and useful Panoramagraph, of which the following is a specification.

My invention relates to the projection art. The principal object of the invention is to provide a device which can be used for advertising, or educational purposes, this device being adapted to project words or symbols on a screen or other plane surface, the image of these words or symbols traveling across the surface of the screen at a constant rate so that long messages may be so exhibited. Further objects and advantages will be evident hereinafter.

In the drawings which are for illustrative purposes only:—

Figure 1 is a plan view of the invention together with a portion of the illuminating means.

Fig. 2 is a side elevation of the same invention, a portion thereof being shown in section to better illustrate the invention.

Fig. 3 is a view of the invention as seen from the lamp house, a portion thereof being broken away to better illustrate the internal structure.

Fig. 4 is a view of a portion of the perforated tape.

Fig. 5 is a somewhat diagrammatic view of the screen.

Broadly considered the invention consists of an illuminating means 11 which may be preferably in the form of an arc lamp 12 as shown, or which may consist of any other suitable luminous source. A condensing lens 13 serves to direct the light from the source 12 through a flexible tape 14, this tape being perforated as shown at 15 in Fig. 4 with the words or symbols which it is desired to project. The tape 14 is kept in continuous motion by means of a motor 16, the tape being wound and unwound from drums 17 and 18 driven by the motor. Suitable projection lenses are mounted in a projecting tube 19, these lenses throwing the image of the words or symbols carried on the tape 14 on a suitable screen.

In the form of the invention illustrated in the drawings a table 20 is provided, this table having suitable legs 21 and carrying the lamp house 22 in which the arc lamp 12 is placed. The lens 13 is mounted in a projection on the front of the lamp house 22. Shields 23 and 24 are placed over the outer lens 25 forming an elongated rectangular aperture 26. A shutter 27 is provided so placed that it can be pushed down to shut off this light if desired. An aperture plate 27 is secured to a base 28, mounted on the table 20, this aperture plate having an aperture 29. The tape 14 passes over the plate 27 in such a position that the words or symbols 15 pass in front of the aperture 29. Spring fingers 30 are secured to the aperture plate 27 above the aperture 29, these spring fingers carrying a plate 31 which rests upon the tape holding it in close contact with the aperture plate 27.

A bracket 32 is secured to the base 28, and extends upwardly being connected to the aperture plate 27 by an upper bearing bracket 33. Vertical shafts 34 and 35 are carried in bearings 36 formed in the upper bearing bracket 33, these shafts being journaled at their lower end 38 on the base 28. Mounted on the shafts 34 and 35 are guide spools 37 and 38, these spools having a raised rim between which the tape 14 moves. Mounted on the shaft 35 is a spur gear 39, this gear meshing with a pinion 40 carried on a shaft 41, which is journaled at its upper end in an extension 42 of the bracket 32, and at its lower end in a bearing 44 formed in the base 28. A bevel gear 45 is also rigidly secured on the shaft 35 and drives a bevel gear 46 turning freely on a short shaft 47 rigidly secured to a bracket 48 which is secured by means of screws 49 to the base 28. The bevel gear 46 has a groove cut therein in such a shape as to receive a round belt 50, this belt passing over an idler 51 turning on a fixed shaft 52 which is supported in a bracket 53. The bracket 53 is secured by means of screws 54 to the side of the base 28. The belt 50 also passes over a belt wheel 55 which is secured to the drum 17. Rigidly mounted on the shaft 41 is a worm gear 56, this worm gear being driven by a worm 57, carried on the shaft of the motor 16. Mounted on a bracket pin 90 carried on a bracket 58, secured to the base 28, is a color changing screen 59, this screen consisting preferably of a metal member having a plurality of colored glass members 60 secured therein, these colored glass members 60 being so located that they can be successively rotated into place in front of the projecting tube 19 so that the light which is projected therethrough can be suitably colored, the words or symbols appearing on the screen being thus shown in colors which can be changed by the operator whenever desired.

The roll 17 is mounted on a shaft 61 carried in brackets 62 and 63, these brackets being secured to the side of the table 20 by screws 64. The bracket 62 extends upwardly and carries an idler pulley 65 which rotates freely on a pin 66, secured in the bracket 62. Pivoted on the shaft 61 adjacent to the bracket 63 is a pivoted arm 67 which is forced in the direction of the arrows 68 by the coil spring 69. Carried on the arm 67 is a pin 70 on which is mounted a loose pulley 71. The tape 14 passes from the aperture 29 around the wheel 37, around the pulley 65, and downwardly around the drum 18, it then passes in successive wraps around the drums 17 and 18 passing off of the drum 17 on the last turn as shown at 75 over the pulley 71, and to the pulley 37 as shown at 76 in Fig. 1. The tape 14 is joined together so that it is continuous, this tape being perforated with a series of words or symbols.

The drum 18 is mounted on a shaft 80 which is carried in arms 81, these arms being slidably mounted in the legs 21 of the table 20, thumb screws 82 being provided to lock them in any position. The drum 18 can therefore be moved up or down to suit this length of tape, and long lengths of tape can be accommodated in the machine so that extended messages may be thrown on the screen as desired.

The method of operation is as follows: The motor 16 is supplied with current from any suitable source, and the arc lamp 12 is energized so that it throws a beam of light against the condensers 13. The motor 16 drives the shaft 41 through the worm 57 and the worm gear 56, and the shaft 41 drives the shaft 35 through the gears 41 and 39. The shaft 35 drives the belt 50 passing around the groove in the bevel gear 46, and the pulley 55 drives the drum 17, the drum 18 turning freely and being driven through the tape 14. The tape is therefore moved in the direction of the arrows shown in the drawings, and the various words and symbols perforated therein pass before the aperture 29, and in front of the aperture 26. The light through these perforations is directed by the projecting lenses in the projecting tube 19 through one of the colored glass members 60 against the screen. As a result the image of the words or symbols on the tape 14 is thrown against the screen, these images traveling across the screen from right to left at a slow rate of speed so that new words or symbols are constantly appearing on the screen.

One convenient application of the invention is for advertising purposes, the panoramagraph being set up in such a position that it can throw its image on a screen or blank wall located in a position where it can be seen by the public. When so located the panoramagraph can be put in operation and will operate with very little attention, successively throwing upon the screen the words or symbols perforated in the tape 14, the words or symbols constituting advertising matter.

Other uses such as educational ones will readily occur to one skilled in the projecting art.

I claim as my invention:—

1. An advertising device comprising an endless flexible opaque tape having words running lengthwise of the tape, formed therein by perforations; means for projecting the image of said perforations on a screen; driving means for continuously moving said tape so that the projected image is in continuous motion; a pair of drums having parallel axes; means for winding the tape about said drum; and means by which the distance between the axes of the drums is varied to suit different lengths of tape.

2. A combination as in claim 1 in which the driving means is applied to one of the drums.

In testimony whereof, I have hereunto set my hand at Los Angeles, California, this 9th day of August, 1915.

JOHN J. TARTT.